ical to the Formula II type Grignard reagent is used. The compound III is an Formula III compound when $R^2 = H$.

United States Patent Office 3,657,257
Patented Apr. 18, 1972

3,657,257
3-ARYL-8-CARBAMOYL NORTROPANES
Grover Cleveland Helsley, Richmond, Va., assignor to A. H. Robins Company, Incorporated, Richmond, Va.
No Drawing. Filed Aug. 31, 1970, Ser. No. 68,592
Int. Cl. C07d *43/06*
U.S. Cl. 260—292
8 Claims

ABSTRACT OF THE DISCLOSURE

3α-aryl-8-carbamoyl nortropanes and 3β-aryl-8-carbamoyl nortropanes are described which are prepared by reacting the precursor 3α-arylnortropanes and 3β-arylnortropanes with nitrourea and isocyanates. Methods are disclosed whereby the precursor 3α-arylnortropanes and 3β-arylnortropanes can be prepared. The compounds have anticonvulsant properties.

---

The present invention relates to 3,8-disubstituted nortropanes and is more particularly concerned with 3-aryl-8-carbamoyl nortropanes, their alpha and beta isomeric configurations and to methods for producing them.

As determined by standard pharmacological procedures, the novel compounds described hereinafter have utility as physiologically active agents and particularly as anticonvulsants.

The invention is especially concerned with novel compounds having the formula:

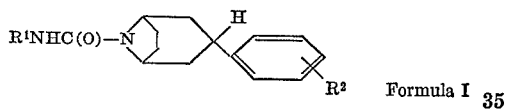

Formula I wherein;

$R^1$ is selected from the group consisting of hydrogen, lower-alkyl, phenyl, trifluoromethylphenyl and lower-alkoxyphenyl, and $R^2$ is selected from the group consisting of hydrogen, trifluoromethyl, lower-alkyl, and lower-alkoxy.

The novel compounds of Formula I described and claimed hereinafter exist in alpha and beta isomeric configurations as determined by the spatial relationship of the aryl group in the 3-position to the nitrogen atom. The starting materials for the novel compounds of Formula I are the 3α-arylnortropanes and 3β-arylnortropanes represented bv the following structural formula:

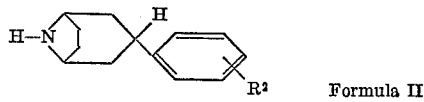

Formula II

In the foregoing Formulas I and II and where they appear elsewhere throughout this specification the terms have the following significance.

The term "lower-alkyl" as used herein includes straight and branched chain radicals of up to eight carbon atoms inclusive and is exemplified by such groups as methyl, ethyl, propyl, isopropyl, butyl, tertiary butyl, amyl, hexyl, isoamyl, heptyl, octyl and the like.

The primary object of this invention is to provide novel 3-aryl-8-carbamoyl nortropanes and processes for their production. Another object of the present invention is to provide methods whereby the alpha and beta isomeric configurations of the 3-aryl-8-carbamoyl nortropanes can be made. Other objects and advantageous features of the present invention will be apparent to one skilled in the art and still other objects will become apparent from the following description and the appended claims.

The processes provided by the present invention for the preparation of the starting materials of Formula II are multistep processes, one process providing nortropanes having the alpha configuration and the other process providing compounds having the beta configuration. The first step of the process leading to compounds of Formula II having the alpha configuration involves the reaction of 8-benzylnortropinone with a suitable aryl Grignard reagent to give an 8-benzyl-3-arylnortropine which is then debenzylated to a 3-arylnortropine. The latter compound is dehydrated under mildly acidic conditions to give a 3-acrylnortropidine which is catalytically reduced using a noble metal catalyst to the 3α-arylnortropane. The first step of the process leading to compounds of Formula II having the beta configuration involves the reaction of a 3β-aryltropine in the presence of Raney nickel catalyst to give a 3β-aryltropane. The 3β-aryltropane is reacted with cyanogen bromide to give an 8-cyano-3β-arylnortropane which is hydrolyzed in concentrated mineral acid to 3β-arylnortropane.

The above processses can be better understood by reference to the reactions outlined in Chart I and Chart II below, wherein the $R^2$ has the values given hereinabove

CHART I

α-Configuration

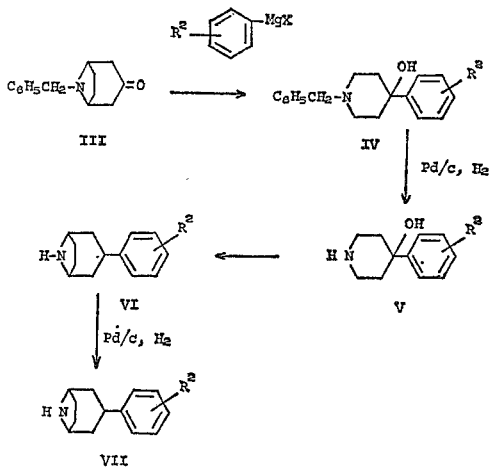

CHART II

β-Configuration

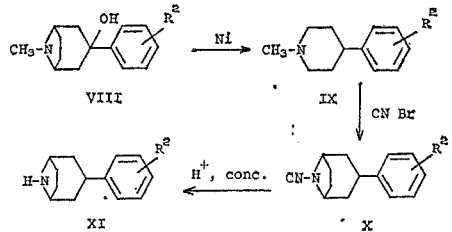

According to the reaction scheme outlined in Chart I above, an 8-benzyl-3-nortropinone III is reacted with a suitable Grignard reagent at a temperature from about 20° C. to about 80° C. for a period of from about 4 hours to about 16 hours to give an 8-benzyl-3-arylnortropine IV. The 8-benzyl-3-arylnortropine is shaken in an atmosphere of hydrogen using a noble metal catalyst, such as palladium, until one equivalent of hydrogen has been absorbed to give a 3-arylnortropine V. The 3-arylnortropine is dehydrated using a dilute mineral acid such as dilute hydrochloric acid to give a 2,3-dihydro-3-arylnortropane VI which is reduced using a noble metal catalyst, illustratively palladium, to a 3α-arylnortropane VII.

According to the reaction scheme outlined in Chart II above, the novel compounds of Formula II having the beta configuration are prepared from 3β-aryltropines VIII. A 3β-aryltropine is shaken with Raney nickel catalyst in a lower alkanol solvent as, for example, ethanol, to give a 3β-aryltropane is then reacted with a slight excess of cyanogen bromide in a suitable solvent medium, illustratively chloroform, to give an 8-cyano-3β-arylnortropane X which is isolated and is then hydrolyzed, usually without further purification, in a concentrated mineral acid, illustratively hydrochloric acid, to provide the 3β-arylnortropane XI.

The preparation of 8-carbamoyl-3α-arylnortropanes (I) and 8-carbamoyl-3β-arylnortropanes (I) may be accomplished by mixing and reacting the appropriately substituted 3α-arylnortropane (II) and 3β-arylnortropane (II) with a substituted isocyanate (XII) and nitrourea (XIII). The reaction sequence is illustrated by the following:

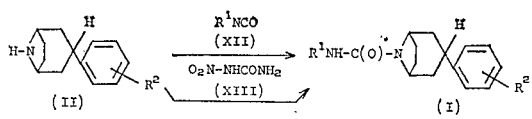

$R^1$ and $R^2$ having the values given hereinabove.

The reaction of the active hydrogen present on the nitrogen atom of the nortropane (II) is carried out in an aprotic solvent such as benzene by the slow addition of the selected isocyanate dissolved in the same solvent. Following the addition, the reaction mixture is stirred for a period of from about one hour to about four hours and then the solvent is removed by evaporation at reduced pressure. The solid product obtained after removal of the solvent may be purified in an appropriate manner such as recrystallization from selected solvents. When one of the reactants is nitrourea, a stirred mixture of the nortropane (II) and the nitrourea in a lower alkanol solvent such as ethanol is heated gently until the evaluation of gas diminishes. The mixture is optionally refluxed for a period of from about one hour to about two hours and after cooling and filtration of the mixture, the filtrate is concentrated at reduced pressure and the solid product is purified as described hereinabove.

The methods employed for the preparation of the 3α-arylnortropanes and 3β-arylnortropanes used as starting materials for the novel 8-carbamoyl-3α-arylnortropanes and 8-carbamoyl-3β-arylnortropanes are given in the preparations which follow. The examples illustrate the methods whereby the novel compounds of the present invention are prepared. It is to be understood that the examples given are merely illustrative and are not to be construed as limiting.

PREPARATION 1

8-benzyl-3-(m-trifluoromethylphenyl)nortropanol

A Grignard solution of m-trifluoromethylphenylmagnesium bromide in dry tetrahydrofuran was prepared using 4.4 g. (0.18 mole) of magnesium turnings, 200 ml. of dry tetrahydrofuran, a crystal of iodine and 40.5 g. (0.18 mole) of m-bromobenzotrifluoride. A solution of 27 g. (0.125 mole) of 8-benzylnortropanone in 100 ml. of dry tetrahydrofuran was slowly added to the stirred Grignard solution and after the addition was completed, the mixture was stirred at reflux for 16 hours. The cooled mixture was poured onto one liter of ice water containing 10.7 g. (0.20 mole) of ammonium chloride. The oil which separated was extracted with benzene, extracts were combined, washed with water, dried (magnesium sulfate) and the solvent evaporated from the dried solution. The residual oil was distilled at 165–170° C./0.05 mm. The viscous oil crystallized on standing and weighed 15.0 g. (33% yield). A sample melted at 88–92° C. after it was recrystallized from petroleum ether (30–60° C.).

*Analysis.*—Calculated for $C_{21}H_{22}F_3NO$ (percent): C, 69.79; H, 6.14; N, 3.88. Found (percent): C, 69.82; H, 6.12; N, 3.98.

PREPARATION 2

When, in the procedure of Preparation 1, m-bromobenzotrifluoride is replaced by an equal molar amount of the following:

p-anisylbromobenzene,
p-ethoxybromobenzene,
o-tolylbromobenzene, and
p-ethylbromobenzene, there are obtained:

8-benzyl-3-(p-anisyl)nortropanol,
8-benzyl-3-(p-ethylphenyl)nortropanol,
8-benzyl-3-(o-tolyl)nortropanol, and
8-benzyl-3-(p-ethylphenyl)nortropanol.

PREPARATION 3

3-(m-trifluoromethylphenyl)nortropanol

A solution of 12.0 g. of 8-benzyl-3-(m-trifluoromethylphenyl)nortropanol in 200 ml. of 95% ethanol containing 5 g. of palladium-on-charcoal catalyst was shaken in three atmospheres of hydrogen at 60° C. until one equivalent of hydrogen was absorbed. The cooled mixture was filtered and the filtrate was concentrated at reduced pressure. The residual oil crystallized on cooling and was recrystallized from an isopropanol-isopropyl ether mixture yielding 6.9 g. (77%) of white product that melted at 155–159° C.

*Analysis.*—Calculated for $C_{14}H_{16}F_3NO$ (percent): C, 61.98; H, 5.95; N, 5.12. Found (percent): C, 61.86; H, 5.87; N, 5.18.

PREPARATION 4

When, in the procedure of Preparation 3, 8-benzyl-3-(m-trifluoromethylphenyl)nortropanol is replaced by an equal molar amount of the following:

8-benzyl-3-(p-anisyl)nortropanol
8-benzyl-3-(p-ethoxyphenyl)nortropanol,
8-benzyl-3-(o-tolyl)nortropanol, and
8-benzyl-3-(p-ethylphenyl)nortropanol, there are obtained 3-(p-anisyl)nortropanol,
3-(p-ethoxyphenyl)nortropanol,
3-(o-tolyl)nortropanol, and
3-(p-ethylphenyl)nortropanol.

PREPARATION 5

3-phenylnortropanol 8-benzyl-3-phenylnortropanol was debenzylated using the procedure of Preparation 2. The white product melted at 192–155° C. and weighed 17.2 g. (78% yield) after it was recrystallized from an isopropanol-isopropyl ether mixture.

*Analysis.*—Calculated for $C_{13}H_{17}NO$ (percent): C, 76.81; H, 8.43; N, 6.89. Found (percent): C, 77.12; H, 8.56; N, 6.80.

PREPARATION 6

3-phenylnortropidine hydrochloride

A solution of 5 g. of 3-phenylnortropanol in 75 ml. of 6 N hydrochloric acid was refluxed for 16 hours, cooled and the solution made basic using 25% sodium hydroxide solution. The base insoluble oil was extracted with benzene, the combined extracts were washed with water, dried (magnesium sulfate) and the solvent evaporated. The residual oil weighed 3.6 g. (79% yield) and was converted to the hydrochoride salt. The salt melted with decomposition at 284–287° C. after it was recrystallized from isopropyl alcohol.

*Analysis.*—Calculated for $C_{13}H_{16}ClN$ (percent): C, 70.42; H, 7.27; N, 6.32. Found (percent): C, 70.48; H, 7.36; N, 6.13.

PREPARATION 7

3-(m-trifluoromethylphenyl)nortropidine oxalate hemihydrate 3-(m-trifluoromethylphenyl)nortropanol (7.5 g.) was dehydrated using the procedure of Preparation 4 to give 5.6 g. (77% yield) of the free base was converted to the oxalate salt which melted at 209–211° C. after it was recrystallized from an isopropanol-isopropyl ether mixture.

*Analysis.*—Calculated for $C_{30}H_{32}F_6N_2O_5$ (percent): C, 57.69; H, 5.16; N, 4.49. Found (percent): C, 57.58; H, 4.92; N, 4.35.

PREPARATION 8

When, in the procedure of Preparation 7, 3-(m-trifluoromethylphenyl)nortropanol is replaced by an equal molar amount of 3-(p-anisyl)nortropanol,
3-(p-ethoxyphenyl)nortropanol,
3-(o-tolyl)nortropanol, and
3-(p-ethylphenyl)nortropanol there are obtained, 3-(p-anisyl)nortropidine,
3-(p-ethoxyphenyl)nortropidine,
3-(o-tolyl)nortropidine, and
3-(p-ethylphenyl)nortropidine.

PREPARATION 9

3α-phenylnortropane hydrochloride

A solution of 7.9 g. of 3-phenylnortropidine in 200 ml. of 95% ethanol containing 5 g. of 10% palladium-on-charcoal catalyst was shaken in three atmospheres of hydrogen for 1.5 hours. The suspension was filtered and the filtrate concentrated; the residual oil weighed 8.0 g. representing a quantitative yield. A sample of the free base (1.0 g.) was converted to the hydrochloride salt which melted at 203–204° C. after it was recrystallized from an isopropyl alcohol-ethyl ether solvent mixture.

*Analysis.*—Calculated for $C_{13}H_{18}ClN$ (percent): C, 69.78; H, 8.11; N, 6.26. Found (percent): C, 69.75; H, 8.14; N, 6.15.

PREPARATION 10

3α-(m-trifluoromethylphenyl)nortropane oxalate 3-(m-trifluoromethylphenyl)nortropidine (11.0 g.) was catalytically reduced using the procedure of Preparation 6 to given 10.4 g. (94%) of 3α-(m-trifluoromethylphenyl) nortropane which was converted to the oxalate salt which melted at 194-196° C. after it was recrystallized from an isopropanol-methanol mixture.

*Analysis.*—Calculated for $C_{16}H_{18}NO_4$ (percent): C, 55.65; H, 5.25; N, 4.06. Found (percent): C, 55.66; H, 5.27; N, 4.16.

PREPARATION 11

When, in the procedure of Preparation 10, 3-(m-trifluoromethylphenyl)nortropidine is replaced by an equal molar amount of 3-(p-anisyl)nortropidine,
3-(p-ethoxyphenyl)nortropidine,
3-(o-tolyl)nortropidine, and
3-(p-ethyl)nortropidine, there are obtained 3α-(p-anisyl)nortropane,
3α-(p-ethoxyphenyl)nortropane,
3α-(o-tolyl)nortropane, and
3α-(p-ethyl)nortropane.

PREPARATION 12

3β-phenyltropane

A solution of 10 g. of 3β-phenyltropine in 150 ml. of 95% ethanol containing 20 g. of moist Raney nickel catalyst was refluxed for a period of about five hours. The reaction mixture was filtered and the solvent evaporated to give 8 g. of a heterogeneous residue consisting of a waxey material and a light oil which was thoroughly mixed with 25% sodium hydroxide solution and the basic solution resulting therefrom was extracted repeatedly with benzene. The combined benzene extracts were washed, dried over magnesium sulfate and then concentrated at reduced pressure. Six grams of a light oil was obtained. A nuclear magnetic resonance spectrum of the oil indicated the product to be 3β-phenyltropane.

PREPARATION 13

When, in the procedure of Preparation 12, 3β-phenyltropine is replaced by an equal molar amount of the following:

3β-(p-anisyl)tropine,
3β-(p-ethoxyphenyl)tropine,
3β-(o-tolyl)tropine, and
3β-(p-ethylphenyl)tropine, there are obtained, 3β-(p-anisyl)tropane,
3β-(p-ethoxyphenyl)tropane,
3β-(o-tolyl)tropane, and
3β-(p-ethylphenyl)tropane.

PREPARATION 14

8-cyano-3β-phenylnortropane

To a stirred solution of 4.8 g. (0.045 mole) of cyanogen bromide in 100 ml. of chloroform was added a solution of 6.1 g. (0.030 mole) of 3β-phenyltropane in 50 ml. of chloroform over a period of two hours. After the addition was complete, the solution was refluxed for two hours and then the solvent was evaporated at reduced pressure. The residual oil which crystallized on cooling weighed 6.1 g. (96% yield). A sample (0.7 g.) of the crude product was recrystallized from isooctane, yielding 0.5 g. of white product melting at 116–118° C.

*Analysis.*—Calculated for $C_{14}H_{16}N_2$ (percent): C, 79.20; H, 7.60; N, 13.20. Found (percent): C, 79.26; H, 7.60; N, 13.16.

PREPARATION 15

When, in the procedure of Preparation 14, 3β-phenyltropane is replaced by an equal molar amount of the following:

3β-(p-anisyl)tropane,
3β-(p-ethoxyphenyl)tropane,
3β-(o-tolyl)tropane, and
3β-(p-ethylphenyl)tropane there are obtained, 8-cyano-3β-(p-anisyl)nortropane,
8-cyano-3β-(p-ethoxyphenyl)nortropane,
8-cyano-3β-(o-tolyl)nortropane, and
8-cyano-3β-(p-ethylphenyl)nortropane.

PREPARATION 16

3β-phenylnortropane hydrochloride

3β-phenylnortropane is prepared in good yield by refluxing 8-cyano-3β-phenylnortropane in an excess amount of concentrated hydrochloric acid for a period of from about 20 to about 40 hours. The free base is isolated by basification of the acid hydrolyzate and extraction of the base insoluble oil using chloroform. The chloroform is evaporated and the residual oil is converted to the hydrochloride salt which melts at 193–195° C. after recrystallization from 2-butanone.

*Analysis.*—Calculated for $C_{13}H_{18}ClN$ (percent): C, 69.78; H, 8.11; N, 6.26. Found (percent): C, 69.81; H, 8.13; N, 6.32.

PREPARATION 17

When, in the procedure of Preparation 16, 8-cyano-3β-phenylnortropane is replaced by an equal molar amount of the following:

8-cyno-3β-(p-anisyl)nortropane,
8-cyano-3β-(p-ethoxyphenyl) nortropane,
8-cyano-3β-(o-tolyl)nortropane, and
8-cyano-3β-(p-ethylphenyl)nortropane, there are obtained, 3β-(p-anisyl)nortropane,
3β-(p-ethoxyphenyl)nortropane,
3β-(o-tolyl)nortropane, and
3β-(p-ethylphenyl)nortropane.

EXAMPLE 1

8-(N-ethylcarbamoyl)-3α-(m-trifluoromethylphenyl) nortropane

To a stirred solution of 3.8 g. (0.015 mole) of 3α-(m-trifluoromethylphenyl)nortropane in 75 ml. of dry benzene was added slowly a solution of 0.4 g. (0.020 mole) of ethyl isocyanate in 25 ml. of benzene. After the addition was complete, the mixture was stirred for 40 minutes at room temperature and then the solvent was evaporated at reduced pressure. The residual oil which solidified on cooling was recrystallized from a benzeneisooctane mixture, yielding 3.0 g. (62%) of product melting at 148–149° C.

*Analysis.*—Calculated for $C_{17}H_{21}F_3NO$ (percent): C, 62.56; H, 6.49; N, 8.58. Found (percent): C, 62.60; H, 6.45; N, 8.62.

Pharmacology: Three mice of five were protected against convulsions induced by electroshock at a dose level of 100 mg./kg., i.p.

EXAMPLE 2

8-carbamoyl-3α-(m-trifluoromethylphenyl)nortropane

A stirred mixture of 4.1 g. (0.016 mole) of 3α-(m-trifluoromethylphenyl)nortropane, 2.1 g. (0.020 mole) of nitrourea and 150 ml. of 95% ethanol was heated gently until the evolution of gas ceased and then refluxed for one hour. The solution was cooled, filtered, and the filtrate concentrated at reduced pressure. The residual oil was taken up in ethyl acetate and treated with isopropyl ether until turbidity occurred. Upon standing a crystalline product formed which melted at 171–173° C. and weighed 2.0 g. (51% yield).

*Analysis.*—Calculated for $C_{15}H_{17}F_3N_2O$ (percent): C, 60.39; H, 5.75; N, 9.39. Found (percent): C, 60.40; H, 5.78; N, 9.27.

Pharmacology: Four mice of five were protected against convulsions induced by electroshock at a dose level of 45 mg./kg., i.p.

EXAMPLE 3

8-carbamoyl-3α-phenylnortropane

A stirred mixture of 2.8 g. (0.015 mole) of 3α-phenylnortropane, 2.1 g. (0.020 mole) of nitrourea and 80 ml. of 95% ethanol was heated gently until the evolution of gas ceased and then refluxed for one hour. The mixture was cooled, filtered and the solvent evaporated at reduced pressure. The residual oil which crystallized on standing was recrystallized from water, yielding 2.0 g. (59%) of white product melting at 130–131° C.

*Analysis.*—Calculated for $C_{14}H_{18}N_2O$ (percent): C, 73.01; H, 7.88; N, 12.16. Found (percent): C, 72.57; H, 7.84; N, 12.11.

Pharmacology: Two mice of five were protected against convulsions induced by electroshock at a dose level of 100 mg./kg., i.p.

EXAMPLE 4

8-(N-ethylcarbamoyl)-3α-phenylnortropane

To a stirred solution of 1.9 g. (0.010 mole) of 3α-phenylnortropane in 50 ml. of dry benzene was added slowly a solution of 0.90 g. (0.013 mole) of ethyl isocyanate in 25 ml. of dry benzene. After the addition was complete the mixture was stirred for one hour and then solvent evaporated at reduced pressure. The residual oil which crystallized on trituration with isopropyl ether was recrystallized from the same solvent yielding 1.3 g. (50%) of white product melting at 89.94° C.

*Analysis.*—Calculated for $C_{16}H_{22}N_2O$ (percent): C, 74.38; H, 8.58; N, 10.84. Found (percent): C, 73.80; H, 8.54; N, 10.74.

Pharmacology: Three mice of five were protected against convulsions induced by electroshock at a dose level of 100 mg./kg., i.p.

EXAMPLE 5

8-carbamoyl-3β-phenylnortropane

A mixture of 5.0 g. of 8-cyano-3β-phenylnortropane and 150 ml. of 6 N hydrochloric acid was refluxed for 16 hours, cooled and made basic with 50% sodium hydroxide solution. The basic aqueous suspension was extracted with benzene and the combined extracts washed with water, dried (magnesium sulfate) and the solvent evaporated. The residual oil which weighed 2.5 g. was treated with isopropyl ether and the crystalline product which formed was separated by filtration and recrystallized from an ethyl acetate-isopropyl ether mixture yielding 0.9 g. (17% yield) of white product melting at 172–175° C.

*Analysis.*—Calculated for $C_{14}H_{18}N_2O$ (percent): C, 73.01; H, 7.88; N, 12.17. Found (percent): C, 72.65; H, 7.87; N, 12.03.

Pharmacology: Three mice of five were protected against convulsions induced by electroshock at a dose level of 100 mg./kg., i.p.; one of five was protected at a dose level of 50 mg./kg., i.p

FORMULATION AND ADMINISTRATION

Effective quantities of any of the foregoing pharmacologically active compounds may be administered to a living animal body orally as in capsules or tablets. Although very small quantities of the active material of the present invention, even as low as one milligram, are effective when minor therapy is involved or in cases of administration to subjects having relatively low body weight, unit dosages are usually 5 milligrams or above, and preferably 25, 50 or 100 milligrams or even higher. Five to 50 milligrams appears optimum while usual broader ranges appear to be 1 to 100 milligrams per unit dose. The active agents of the invention may be combined with other pharmacologically active agents or with buffers, antacids or the like for administration, and the proportion of the active agent in the composition may be varied widely. It is only necessary that the active ingredient constitute an effective amount; i.e., such that a suitable effective dosage will be obtained consistent with the dosage form employed. Obviously, several unit dosages may be administered at about the same time.

It is to be understood that the invention is not to be limited to the exact detail of operation or exact compounds shown and described, as obvious modification and equivalents will be apparent to one skilled in the art and the invention is therefore to be limited only by the scope of the appended claims.

What is claimed:

1. A compound selected from 3α- and 3β-phenyl (and mono-substituted phenyl)nortropanes having the formula:

wherein:

R¹ is selected from the group consisting of hydrogen, lower-alkyl, phenyl, trifluoromethylphenyl and lower-alkoxyphenyl, and R² is selected from the group consisting of hydrogen, trifluoromethyl, lower-alkyl and lower-alkoxy.

2. A compound of claim 1 wherein the 3-phenyl (and mono-substituted phenyl) radical has the alpha isomeric configuration with respect to the nitrogen atom.

3. A compound of claim 1 wherein the 3-phenyl (and mono-substituted phenyl) radical has the beta isomeric configuration with respect to the nitrogen atom.

4. A compound of claim 1 which is 8-carbamoyl-3α-phenylnortropane.

5. A compound of claim 1 which is 8-carbamoyl-3β-phenylnortropane.

6. A compound of claim 1 which is 8-(N-ethylcarbamoyl)-3α-(m-trifluoromethylphenyl)nortropane.

7. A compound of claim 1 which is 8-carbamoyl-3α-(m-trifluoromethylphenyl)nortropane.

8. A compound of claim 1 which is 8-(N-ethylcarbamoyl)-3α-phenylnortropane.

References Cited
UNITED STATES PATENTS

| | | | |
|---|---|---|---|
| 3,239,592 | 3/1966 | Jucker et al. | 260—292 |
| 3,445,470 | 5/1969 | Jucker et al. | 260—292 |

ALAN L. ROTMAN, Primary Examiner

U.S. Cl. X.R.

424—265

UNITED STATES PATENT OFFICE
CERTIFICATE OF CORRECTION

Patent No. 3,657,257                Dated  Apr. 18, 1972

Inventor(s) Grover Cleveland Helsley

It is certified that error appears in the above-identified patent and that said Letters Patent are hereby corrected as shown below:

Column 2, line 70, change "2,3-dihydro" to read -- 2,3-dehydro--.

Column 5, line 47, change "given" to --give--.; line 51, change "$C_{16}H_{18}NO_4$" to --$C_{16}H_{18}F_3NO_4$--.

Signed and sealed this 3rd day of October 1972.

(SEAL)
Attest:

EDWARD M. FLETCHER, JR.
Attesting Officer

ROBERT GOTTSCHALK
Commissioner of Patents